United States Patent
Hitchcock et al.

(10) Patent No.: US 10,360,124 B2
(45) Date of Patent: *Jul. 23, 2019

(54) DYNAMIC RATE ADJUSTMENT FOR INTERACTION MONITORING

(71) Applicant: Amazon Technologies, Inc., Seattle, WA (US)

(72) Inventors: Daniel Wade Hitchcock, Bothell, WA (US); Brandon William Porter, Yarrow Point, WA (US)

(73) Assignee: Amazon Technologies, Inc., Seattle, WA (US)

(*) Notice: Subject to any disclaimer, the term of this patent is extended or adjusted under 35 U.S.C. 154(b) by 107 days.

This patent is subject to a terminal disclaimer.

(21) Appl. No.: 15/489,533

(22) Filed: Apr. 17, 2017

(65) Prior Publication Data

US 2017/0277615 A1 Sep. 28, 2017

Related U.S. Application Data

(63) Continuation of application No. 14/297,498, filed on Jun. 5, 2014, now Pat. No. 9,626,275.

(51) Int. Cl.
*G06F 11/30* (2006.01)

(52) U.S. Cl.
CPC ...... *G06F 11/3006* (2013.01); *G06F 11/3065* (2013.01); *G06F 11/3093* (2013.01); *G06F 2201/87* (2013.01)

(58) Field of Classification Search
CPC ............ G06F 11/3003; G06F 11/3065; G06F 11/3072

USPC ............................................ 714/45, 47.1
See application file for complete search history.

(56) References Cited

U.S. PATENT DOCUMENTS

| | | | |
|---|---|---|---|
| 5,809,121 | A | 9/1998 | Elliott et al. |
| 5,930,344 | A | 7/1999 | Relyea et al. |
| 7,209,548 | B2 | 4/2007 | Ethier et al. |
| 7,496,799 | B2 | 2/2009 | Prang et al. |
| 9,215,151 | B1 | 12/2015 | De Rosa et al. |
| 9,626,275 | B1 | 4/2017 | Hitchcock et al. |
| 9,749,718 | B1* | 8/2017 | Friel .................. H04Q 9/00 |

(Continued)

OTHER PUBLICATIONS

Rodrigo Fonseca, George Porter, Randy H. Katz, Scott Shenker, and Ion Stoica, "X-Trace: A Pervasive Network Tracing Framework," 4th USENIX Symposium on Networked Systems Design & Implementation (NSDI'07), Apr. 2007, pp. 1-14.

(Continued)

*Primary Examiner* — Chae M Ko
(74) *Attorney, Agent, or Firm* — Robert C. Kowert; Meyertons, Hood, Kivlin, Kowert & Goetzel, P.C.

(57) ABSTRACT

Methods and systems for implementing dynamic rate adjustment for interaction monitoring are disclosed. At an entity, the collection of trace information is initiated according to a first sampling rate. The trace information is indicative of interactions between the entity and one or more additional entities. A second sampling rate is determined based at least in part on information external to the entity. The second sampling rate is determined after the collection of the trace information is initiated at the entity according to the first sampling rate. At the entity, the collection of additional trace information is initiated according to the second sampling rate.

20 Claims, 15 Drawing Sheets

(56) References Cited

U.S. PATENT DOCUMENTS

| | | |
|---|---|---|
| 2002/0099812 A1 | 7/2002 | Davis et al. |
| 2007/0124461 A1 | 5/2007 | Kryskow, Jr. et al. |
| 2009/0106390 A1 | 4/2009 | Kirwan, Jr. et al. |
| 2012/0259962 A1 | 10/2012 | Bose et al. |
| 2013/0085861 A1* | 4/2013 | Dunlap .................. G01S 19/34 705/14.58 |
| 2017/0078442 A1* | 3/2017 | Pacella ............... H04L 67/1008 |
| 2017/0316005 A1* | 11/2017 | Minh .................... H04L 43/022 |
| 2018/0091413 A1* | 3/2018 | Richards ............. H04L 12/4641 |

OTHER PUBLICATIONS

Benjamin H. Sigelman, Luiz Andre Barroso, Mike Burrows, Pat Stephenson, Vlanoj Plakal, Donald Beaver, Saul Jaspan, and Chandan Shanbhag, "Dapper, a Large-Scale Distributed Systems Tracing Infrastructure," Google Technical Report dapper-2010-1, Apr. 2010, pp. 1-14.

* cited by examiner

DYNAMIC RATE ADJUSTMENT FOR INTERACTION MONITORING

This application is a continuation of U.S. patent application Ser. No. 14/297,498, filed Jun. 5, 2014, now U.S. Pat. No. 9,626,275, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

In order to monitor the performance or behavior of such a distributed system, the flow of data through the system may be traced. The information resulting from the trace may be analyzed, and actions to improve the performance or behavior may be taken in response to the analysis. However, for sufficiently large and complex systems, the computational, network, and/or storage resources required to trace every transaction or to store every trace may exceed an acceptable measure.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for dynamic rate adjustment for interaction monitoring are described. In a distributed system comprising various services and/or other components, interactions between services (e.g., call paths) may be monitored to generate trace information. Using the systems and methods described herein, rates for initiating traces and/or for preserving trace information may be dynamically adjusted. A rate may be adjusted based on information external to the service or component that applies the rate to initiate traces or preserve trace information. For example, various aspects of the performance of the distributed system may be monitored, and the sampling rates and/or preservation rates may be adjusted accordingly. By adjusting rates in this manner, the amount of trace information that is generated and/or preserved may be adjusted based on conditions in the distributed system. Accordingly, the costs of performing the interaction monitoring and storing the resulting data may be considered in the optimization of the distributed system.

Figure 1:
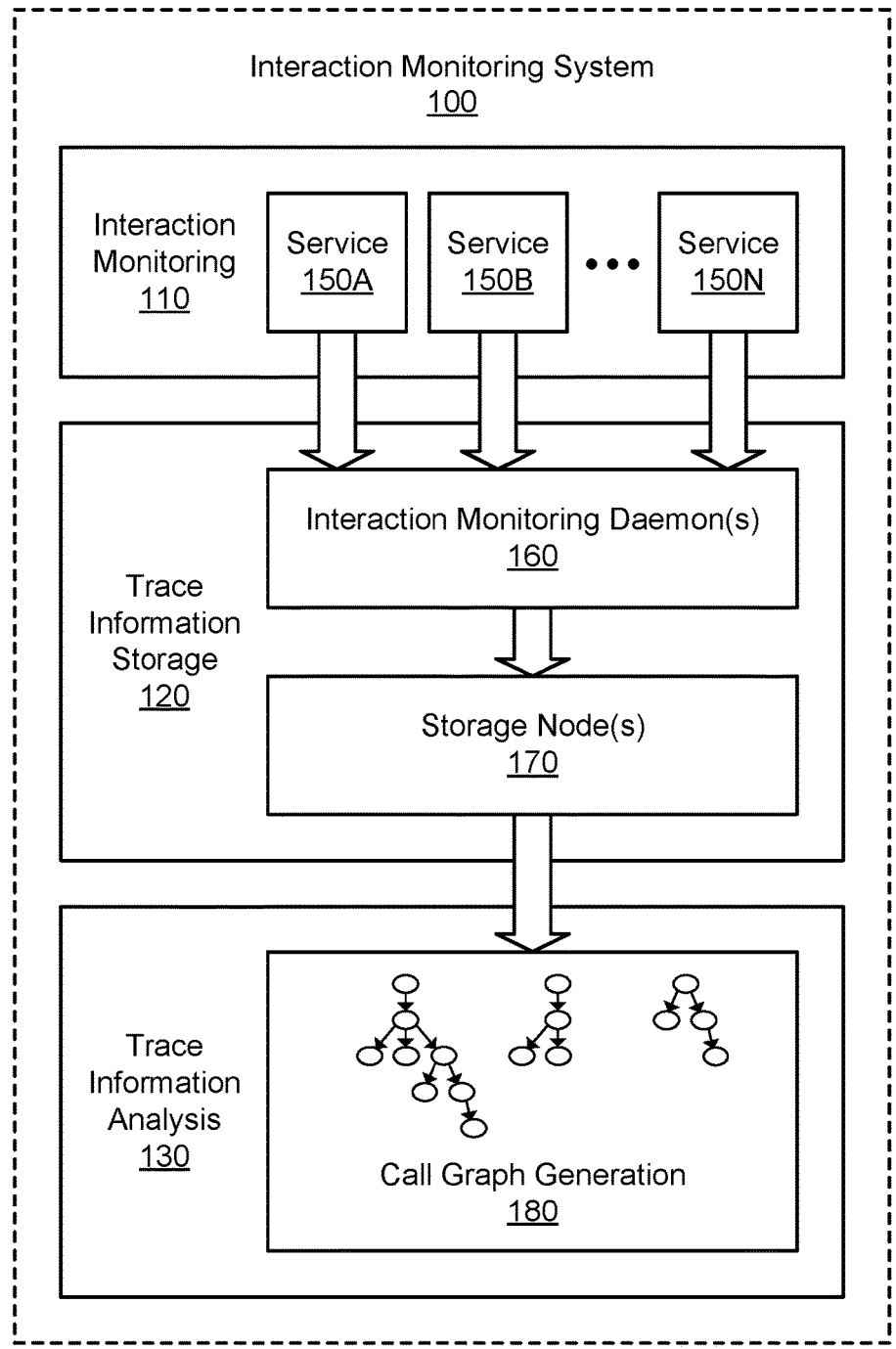
FIG. 1 illustrates an example system environment for dynamic rate adjustment for interaction monitoring, according to some embodiments.

FIG. 1 illustrates an example system environment for dynamic rate adjustment for interaction monitoring, according to some embodiments. The example system environment may include an interaction monitoring system 100. The interaction monitoring system 100 may include a plurality of components for monitoring interactions between entities such as services (including components of services) and efficiently storing trace information based on the monitored interactions. For example, the interaction monitoring system 100 may include interaction monitoring functionality 110, trace information storage functionality 120, and trace information analysis functionality 130.

Figure 16:
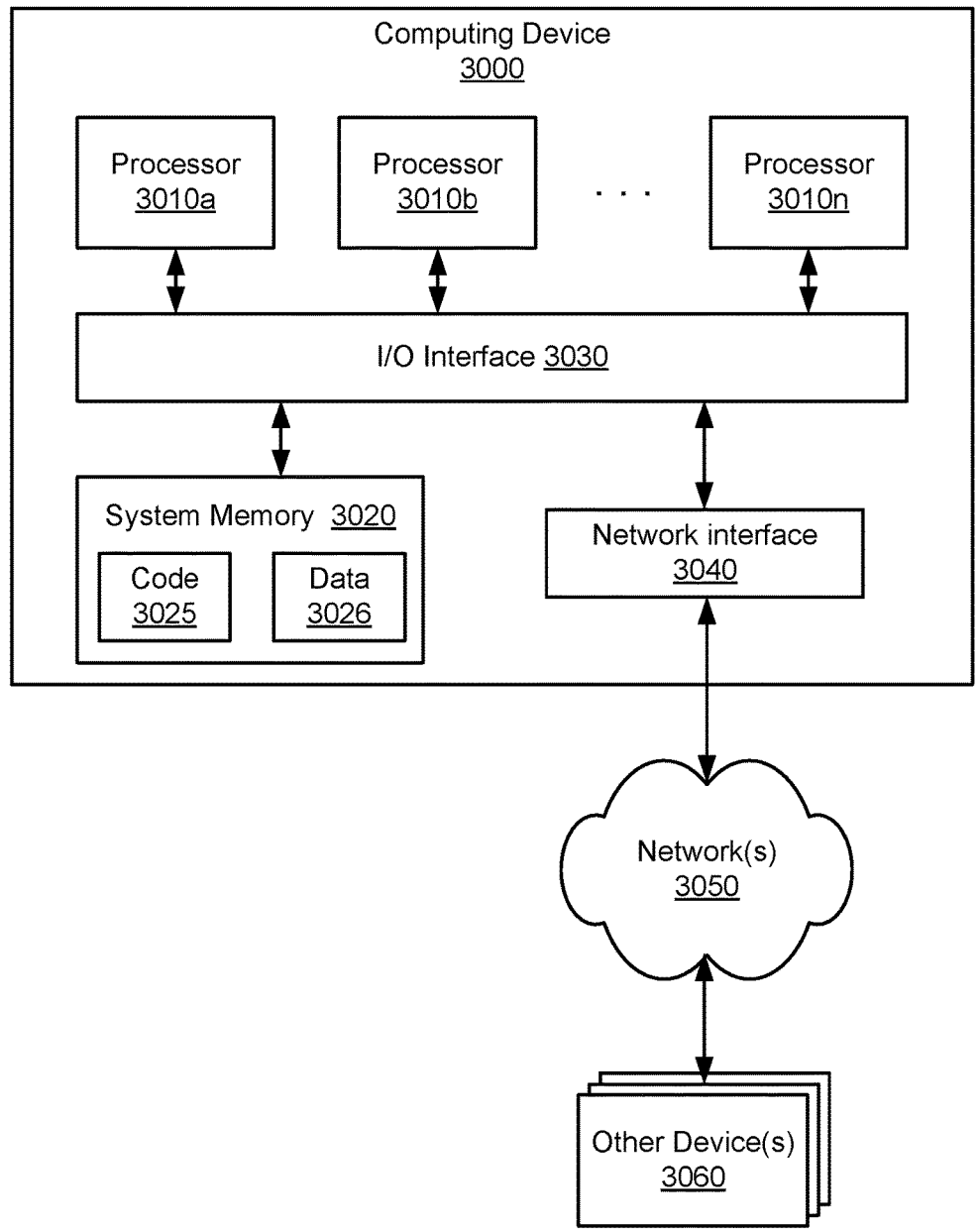
FIG. 16 illustrates an example of a computing device that may be used in some embodiments.

The interaction monitoring system 100 may comprise one or more computing devices, any of which may be implemented by the example computing device 3000 illustrated in FIG. 16. In various embodiments, the functionality of the different services, components, and/or modules of the interaction monitoring system 100 (e.g., interaction monitoring functionality 110, trace information storage functionality 120, and trace information analysis functionality 130) may be provided by the same computing device or by different computing devices. If any of the various components are implemented using different computing devices, then the respective computing devices may be communicatively coupled, e.g., via a network. Each of the interaction monitoring functionality 110, trace information storage functionality 120, and trace information analysis functionality 130 may represent any combination of software and hardware usable to perform their respective functions, as discussed as follows.

The interaction monitoring functionality 110 may monitor or track interactions between entities such as services or components of services in a distributed, service-oriented system, such as a system structured according to a service-oriented architecture (SOA). A service-oriented architecture may include multiple services configured to communicate with each other (e.g., through message passing) to carry out various tasks, such as business process functions. As shown in the example of FIG. 1, the interaction monitoring functionality 110 may monitor interactions between or among services 150A and 150B through 150N. Although three services 150A-150N are shown for purposes of illustration and example, it is contemplated that any suitable number of services (including instances of the same service and/or instances of different services) may be used with the interaction monitoring system 100. The services may be distributed across multiple computing instances and/or multiple subsystems that are connected, e.g., via one or more networks. In some embodiments, such services may be loosely coupled in order to minimize (or in some cases eliminate) interdependencies among services. This modularity may enable services to be reused in order to build various applications through a process referred to as orchestration. A service may include one or more components that may also participate in the service-oriented architecture, e.g., by passing messages to other services or to other components within the same service.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes. The service interactions may include requests (e.g., for services to be performed), responses to requests, and other suitable events.

The services and components described herein may include but are not limited to one or more of network-based services (e.g., a web service), applications, functions, objects, methods (e.g., objected-oriented methods), subroutines, or any other set of computer-executable instructions. In various embodiments, such services and components may communicate through any of a variety of communication protocols, including but not limited to the Simple Object Access Protocol (SOAP). In various embodiments, messages passed between services and components may include but are not limited to Extensible Markup Language (XML) messages or messages of any other markup language or format. In various embodiments, descriptions of operations offered by one or more of the services and components may include Web Service Description Language (WSDL) documents, which may in some cases be provided by a service broker accessible to the services and components. References to services herein may include components within services.

In one embodiment, the interaction monitoring functionality 110 may monitor interactions between services in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services can be invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service interactions, lightweight instrumentation may be added to the services. The instrumentation (e.g., a reporting agent associated with each service) may collect and report data associated with each inbound request, outbound request, or other service interaction (e.g., a timer-based interaction) processed by a service. Further aspects of the service instrumentation, interaction monitoring functionality 110, and trace information storage functionality 120 are discussed below with respect to FIGS. 10-15.

The trace information storage functionality 120 may collect, aggregate, and/or store trace information generated using the interaction monitoring functionality 110. In one embodiment, one or more interaction monitoring daemons 160 may periodically receive elements of trace information from one or more of the services 150A-150N. In some embodiments, the one or more interaction monitoring daemons 160 may determine whether to discard or preserve individual elements of the trace information. When trace information is to be preserved, the one or more interaction monitoring daemons 160 may pass the trace information to one or more storage nodes 170. In one embodiment, the one or more storage nodes 170 may cause the trace information to be stored, e.g., in persistent storage of any suitable configuration. In some embodiments, the one or more interaction monitoring daemons 160 may store individual elements of the trace information in persistent local storage, e.g., storage maintained by the one or more interaction monitoring daemons 160. In some embodiments, the one or more interaction monitoring daemons 160 may generate a summary of the trace information and store the summary or send the summary to one or more other components. In some embodiments, the one or more interaction monitoring daemons 160 may send further information regarding the trace information to one or more other components. Aspects of the trace information storage functionality 120 may be implemented using the log repository 2410 illustrated in FIGS. 13 and 15.

The interaction monitoring system 100 may generate one or more traces based on the collected service interactions. In one embodiment, one or more suitable elements of the trace information analysis functionality 130 may analyze the trace information generated by the interaction monitoring functionality 110 in order to generate traces. Each of the traces may collect data indicative of service interactions involved in satisfying a particular initial request. In one embodiment, a particular trace may include data indicative of a route taken in satisfying a service request and/or a hierarchy of call pathways between services. The route may correspond to a set of call pathways between services. The call pathways may represent inbound service requests and outbound service requests relative to a particular service. To process a given received request, the system described herein may invoke one or more of the types of services described above. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph that specifies, for each particular service of multiple services called to fulfill the same root request, the service that called the particular service and any services called by the particular service.

In one embodiment, the trace information analysis functionality 130 may include a call graph generation functionality 180 that generates one or more call graphs based on trace information generated using the interaction monitoring functionality 110. In some embodiments, the trace information used to generate one or more call graphs may be retrieved from one or more storage nodes 170 or received from one or more daemons 160. A call graph based on a trace may be a hierarchical data structure that include nodes representing the services and edges representing the interactions. In some cases, a call graph may be a deep and broad tree with multiple branches each representing a series of related service calls. Suitable elements of the interaction monitoring system 100, including the trace information analysis functionality 130, may use any suitable data and metadata to build the traces and/or call graphs, such as request identifiers and metadata associated with services and their interactions. The request identifiers and metadata are discussed below with respect to FIGS. 10-15. Aspects of the call graph generation functionality 180 may be implemented using the call graph generation logic 2420 illustrated in FIGS. 13 and 15.

For clarity of description, various terms may be useful for describing elements of a trace or call graph. Note that the following terminology may only be applicable to services and requests of a given trace or call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

The generation of a particular trace may end, and the trace may be finalized, based on any suitable determination. In one embodiment, the trace may be finalized after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the trace may be finalized within minutes. As another example, a root request to fulfill and ship a product order may be expected to be completed within days or weeks; accordingly, the trace may be finalized within weeks or even months.

In some embodiments, the trace information storage functionality 120 may store data corresponding to the traces in an efficient manner, such as by filtering and discarding duplicative traces. Using deduplication techniques, each of the traces generated based on the monitored service interactions may be compared to a set of stored traces, and each of the stored traces may represent a unique trace (e.g., a unique combination of services used in satisfying a root request), an example of a type of trace, or a trace that otherwise satisfies one or more of a set of predefined conditions. If one of the traces does not match any of the stored traces, or if it is sufficiently dissimilar to all of the stored traces, then the trace may be added to the set of stored traces. However, if one of the traces matches or is sufficiently similar to one of the stored traces, the trace may be discarded. In one embodiment, relevant statistics may be updated for the stored trace matching the discarded trace. The statistics may include, for example, a count of hits on the particular trace, an average latency, a percentile latency, and/or any other suitable statistics. For example, the hit count for the stored trace may be incremented for every matching trace that is discarded.

In one embodiment, all or nearly all of the service interactions may be monitored using the techniques described herein. In one embodiment, only a percentage of the service interactions may be monitored, and/or traces may be generated for only a percentage of traceable service requests. Any suitable technique may be used to identify which of the service interactions and/or root requests to trace. In one embodiment, probabilistic sampling techniques may be used to initiate traces for a certain percentage (e.g., 1%) of all traceable root requests. As will be described in greater detail below, sampling rates for services and/or preservation rates for daemons and/or storage nodes may be dynamically adjusted based on suitable conditions throughout the distributed system.

Figure 2:
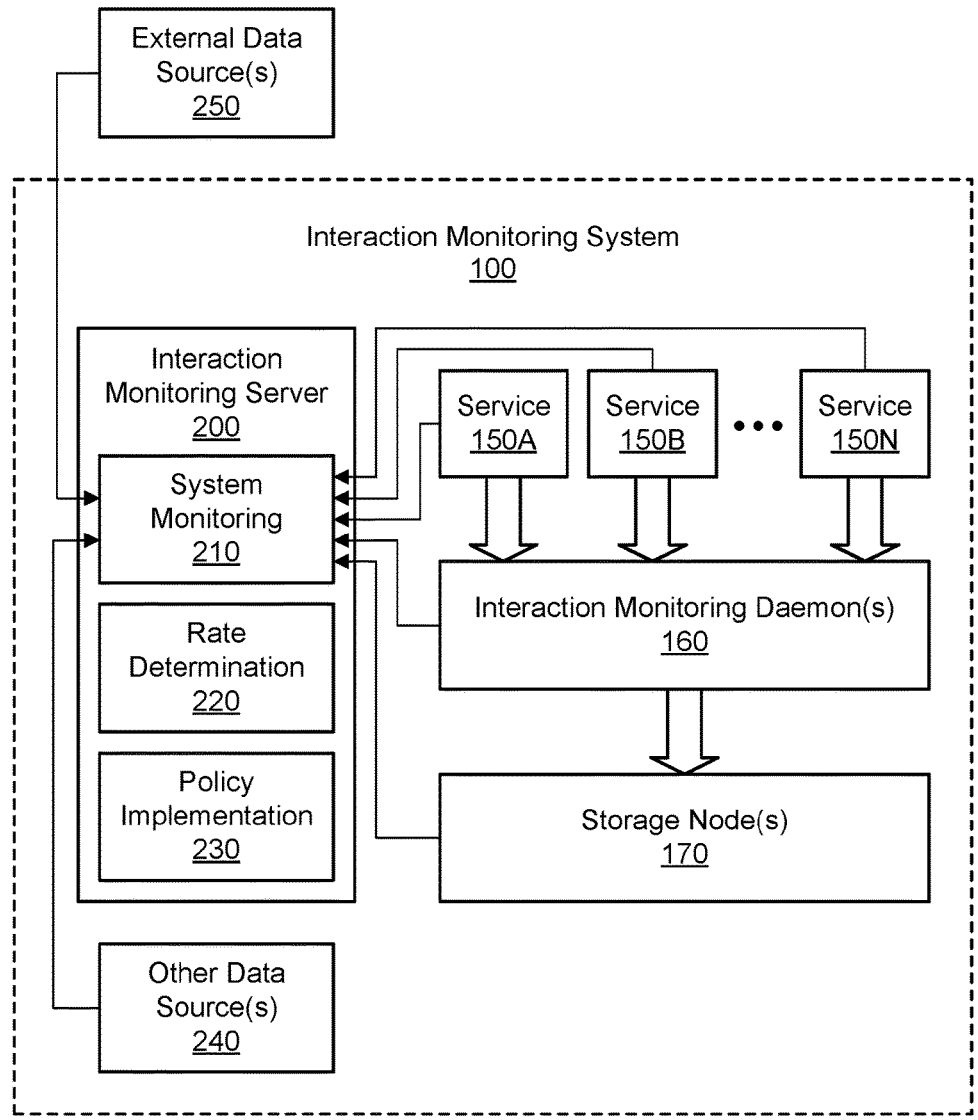
FIG. 2 illustrates further aspects of an example system environment for dynamic rate adjustment for interaction monitoring, according to some embodiments.

FIG. 2 illustrates further aspects of an example system environment for dynamic rate adjustment for interaction monitoring, according to some embodiments. As discussed above with respect to FIG. 1, the interaction monitoring system 100 may include a plurality of components for monitoring interactions between entities such as services and efficiently storing trace information based on the monitored interactions. For example, the interaction monitoring system 100 may include a plurality of services such as services 150A and 150N through 150N, one or more interaction monitoring daemons 160, and one or more storage nodes 170.

Additionally, the interaction monitoring system 100 may include at least one interaction monitoring server 200. Using the interaction monitoring server 200, conditions in a distributed system may be monitored, and sampling rates and/or preservation rates for trace information may be dynamically adjusted in a feedback loop. In various embodiments, the targets of the dynamic rate adjustment may include one or more services 150A-150N, one or more daemons 160, and/or one or more storage nodes 170. The interaction monitoring server 200 may comprise one or more computing devices, any of which may be implemented by the example computing device 3000 illustrated in FIG. 16. In various embodiments, the functionality of the different services, components, and/or modules of the interaction monitoring server 200 (e.g., system monitoring functionality 210, rate determination functionality 220, and policy implementation functionality 230) may be provided by the same computing device or by different computing devices. If any of the various components are implemented using different computing devices, then the respective computing devices may be communicatively coupled, e.g., via a network. Each of the system monitoring functionality 210, rate determination functionality 220, and policy implementation functionality 230 may represent any combination of software and hardware usable to perform their respective functions, as discussed as follows. In some embodiments, all or part of the functionality of the interaction monitoring server 200 may be distributed among other entities, potentially including one or more of the services 150A-150N, the interaction monitoring daemon(s) 160, and/or the storage node(s) 170.

In one embodiment, the system monitoring functionality 210 may monitor any suitable conditions and/or attributes throughout a system such as a distributed, service-oriented system. Accordingly, the system monitoring functionality 210 may monitor any suitable conditions and/or attributes in one or more of the services 150A-150N, one or more of the daemons 160, and/or one or more of the storage nodes 170. Additionally, the system monitoring functionality 210 may monitor any other suitable components or attributes of the service-oriented system, such as other data sources 240. For example, the system monitoring functionality 210 may monitor any suitable performance metrics, such as metrics relating to throughput, latency, processor usage, memory usage, storage usage, network usage, cache efficiency, component I/O performance, etc. The performance metrics may relate to individual components, such as the network traffic at a particular service or host, or to components in the aggregate, such as the network traffic at a set of services or hosts. As another example, the system monitoring functionality 210 may monitor or otherwise have knowledge of the cost of various components, e.g., the cost of particular storage resources, the cost of particular types of service hosts, etc. The system monitoring functionality 210 may acquire data using any suitable techniques, including push and/or pull techniques.

In some embodiments, the system monitoring functionality 210 may also acquire information from one or more external data sources 250, e.g., sources outside the distributed system that includes the services 150A-150N, daemon(s) 160, storage node(s) 170, and other data source(s) 240. For example, the external data source(s) 250 may include newsfeeds for current events, financial events, weather events, internet conditions, etc. In general, the external data source(s) 250 may include any data sources providing information that may prove useful in dynamically adjusting the rates for initiating traces and/or preserving trace information in the distributed system.

In one embodiment, the rate determination functionality 220 may determine sampling rates for initiating traces at individual entities such as services. The sampling rates may be determined based on the system conditions and/or attributes monitored using the system monitoring functionality 210. Similarly, the interaction monitoring server 200 may determine rates for preserving trace information at daemons and/or storage nodes. In determining rates, the rate determination functionality 220 may consider information from a variety of sources, including sources within and without the system that includes the target of the rate change. In general, the rate determination functionality 220 may base the rate determination on information external to the entity whose rate change is determined. However, the rate determination functionality 220 may also consider information provided by the entity whose rate change is determined.

In various embodiments, numerous types of externalities may inform the dynamic adjustment of rates. In one embodiment, the initial sampling rate for a service may be determined based on a variety of factors (e.g., as expressed as coefficients in a formula) when the service is deployed. For example, a sampling rate for a service may be based (in part) on a fleet size of the hosts that implement the service. As the fleet size changes, the size of the fleet may be used to dynamically adjust the sampling rate for a particular service within the fleet. The size of the fleet represents information external to any particular service within the fleet. As another example, the information external to a service may include a determination that all upstream callers are configured to initiate traces; in this case, the sampling initiation may be disabled for the downstream service. Similarly, if the system monitoring functionality 210 determines that some upstream callers are not configured to initiate traces, then the sampling initiation may be enabled again for the downstream service with a suitable sample rate. Another source of external information may include a determination that many redundant traces (e.g., traces involving the same or similar call paths) are being generated; in this case, the sampling rate may be reduced for one or more relevant services. As another example, as total network traffic increases, the number of different use cases may not scale linearly, so the sampling rates for services may be reduced. Similarly, sampling rates may be increased as total traffic decreases. Additionally, global performance metrics may be monitored for the distributed system so that sampling rates may be reduced if critical thresholds have been crossed or are anticipated to be crossed. In general, the external information may be gathered to indicate that the amount of trace information is excessive (e.g., if too much data or too similar data is being observed) or to indicate that the amount of trace information is insufficient (e.g., if debugging is desired for an observed performance problem). Machine learning techniques may be used to identify such external information, e.g., to anticipate changes in network traffic or service load.

In one embodiment, the policy implementation functionality 230 may implement the new sampling rates, preservation rates, and/or related policies for monitoring service interactions. In one embodiment, the new rates and/or policies may be assigned to components without needing to redeploy or restart the affected components, e.g., while the components are deployed and operational. The policy implementation functionality 230 may use any suitable technique to promulgate rates and/or policies to particular services, daemons, and/or storage nodes. For example, sampling policies (including sampling rates) may be distributed from the server 200 to various clients (including services 150A-150N) using distribution/update techniques with client-side reactions. As additional examples, sampling rates may be changed using client-side responses to metric queries or peer-based communication between members of a host class.

Figure 3:
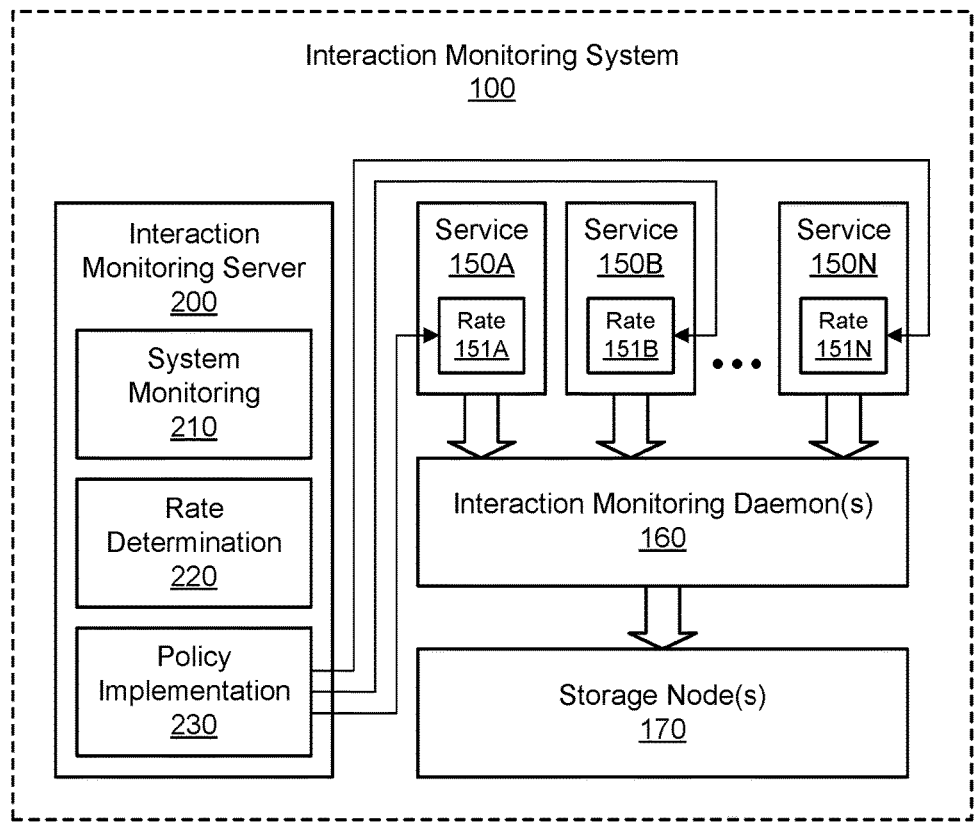
FIG. 3 illustrates further aspects of an example system environment for dynamic rate adjustment for interaction monitoring, including dynamic adjustment of a sampling rate at services, according to some embodiments.

FIG. 3 illustrates further aspects of an example system environment for dynamic rate adjustment for interaction monitoring, including dynamic adjustment of a sampling rate at services, according to some embodiments. The sampling rate at a particular service may indicate a rate at which traces should be initiated at that service. For example, if a particular service receives an incoming service request (or other interaction), and if tracing has not already been enabled in the request, the service may determine whether to initiate a trace for the request based on the sampling rate assigned to the service. The sampling rate at a service may indicate a percentage of all interactions to be traced, a time-based threshold (e.g., a policy to generate a particular number of traces per unit of time), or any other suitable policy for determining when to initiate a trace. As discussed above, the interaction monitoring server 200 may monitor conditions and/or attributes in a distributed system and determine adjusted sampling rates and/or related policies. In one embodiment, the interaction monitoring server 200 may determine and assign individual rates for individual services or for categories of services. For example, as shown in FIG. 3, the interaction monitoring server 200 may determine a sampling rate 151A for service 150A, a sampling rate 151B for service 150B, and a sampling rate 151N for service 151N. In various embodiments, any of the sampling rates 151A-151N may differ from other sampling rates or be identical to other sampling rates, as appropriate.

In one embodiment, one or more of the entities subject to rate changes may perform self-adjustment of rates. For example, one of the services 150A-150N may implement the system monitoring 210 and rate determination 220 functionalities to modify its own sampling rate. The rates determined using the self-adjustment may be limited to upper and/or lower bounds or other policies as permitted by the interaction monitoring server 200. In one embodiment, one or more of the entities may trigger the rate determination functionality 220 by sending an appropriate message to the interaction monitoring server 200. For example, one of the services 150A-150N may trigger the rate determination functionality 220 upon detecting a change in service usage or other local conditions. Additionally, a sampling rate or preservation rate may be determined and assigned to an entity that did not previously enable any operation making use of a sampling rate or preservation rate.

Figure 4:
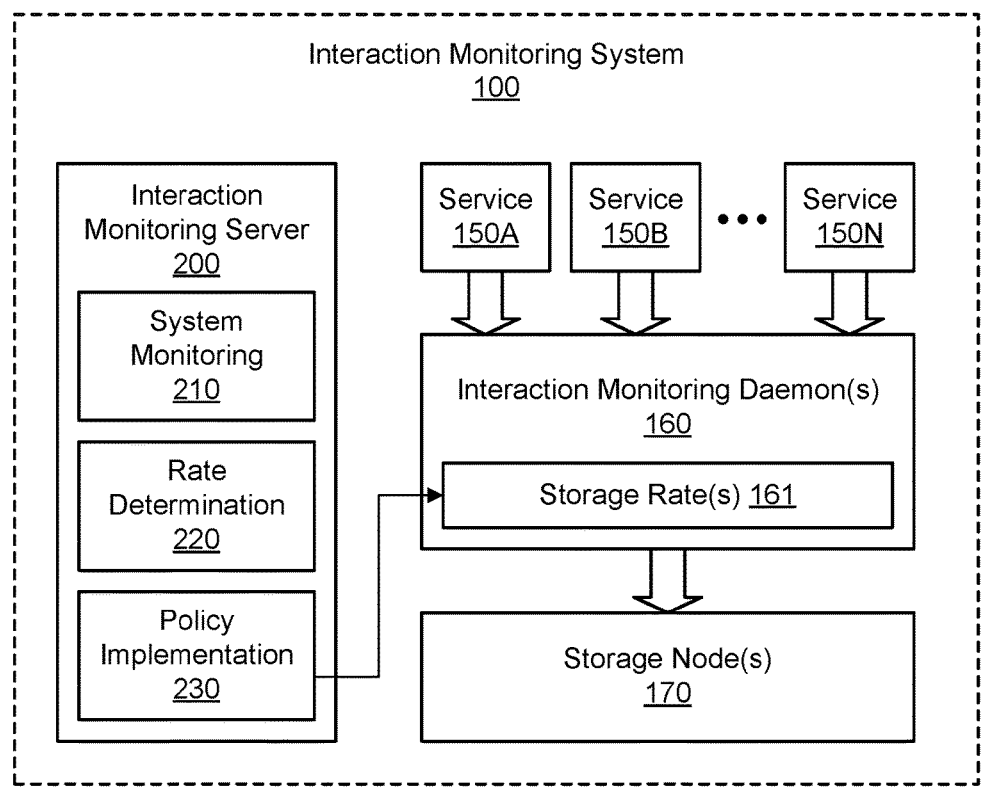
FIG. 4 illustrates further aspects of an example system environment for dynamic rate adjustment for interaction monitoring, including dynamic adjustment of a rate at an interaction monitoring daemon, according to some embodiments.

FIG. 4 illustrates further aspects of an example system environment for dynamic rate adjustment for interaction monitoring, including dynamic adjustment of a rate at an interaction monitoring daemon, according to some embodiments. Using similar techniques as the sampling rate determination discussed above with respect to FIG. 3, the rate determination functionality 220 may determine one or more storage rates and/or related policies for components in the interaction monitoring system 100. The storage rates may be determined based on the system monitoring 210. Storage rates may also be referred to herein as preservation rates or retention rates. In one embodiment, storage rates may be applied by components of the trace information storage functionality 120 (e.g., one or more daemons 160 and/or storage nodes 170) to preserve or discard trace information when all or substantially all of the interactions among services are traced, resulting in a very large amount of trace information to be processed by the trace information storage functionality 120.

The storage rate at a particular component may indicate a rate at which trace information should be stored, preserved, or maintained at that component. For example, if a particular daemon receives trace information from one or more services, the daemon may determine whether to preserve or discard the trace information based on the storage rate assigned to the daemon. The storage rate at a service may indicate a percentage of all trace data to be preserved, a time-based threshold (e.g., a policy to preserve a particular amount of trace data per unit of time), or any other suitable policy for determining when to store or preserve trace information. As discussed above, the interaction monitoring server 200 may monitor conditions and/or attributes in a distributed system and determine adjusted storage rates and/or related policies. In one embodiment, the interaction monitoring server 200 may determine and assign individual rates for individual components of the trace information storage functionality 120. For example, as shown in FIG. 4, the interaction monitoring server 200 may determine one or more storage rates 161 for the daemon(s) 160. In one embodiment, the daemon(s) may apply different storage rates or related policies to trace information associated with different services or hosts, e.g., by masking the relevant bits in each trace ID to identify the originating host name or service name in the trace information. In one embodiment, the same storage rates may be assigned to multiple daemons so that policies for trace information preservation may be carried out in a uniform or consistent manner across the distributed system.

Figure 5:
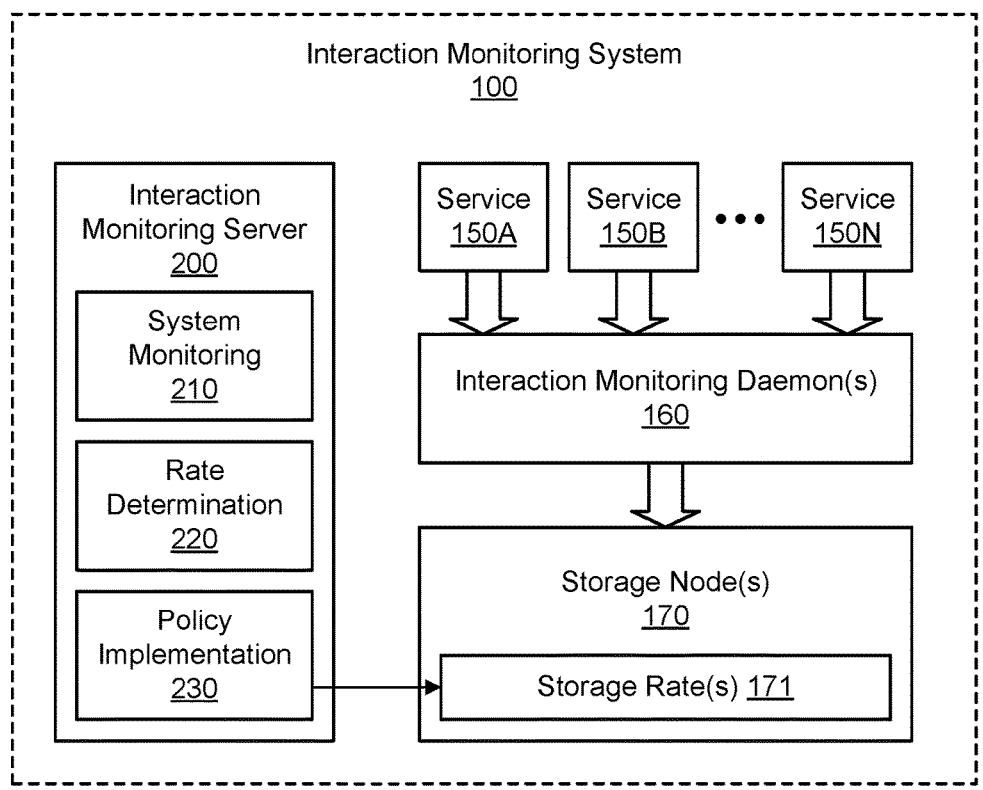
FIG. 5 illustrates further aspects of an example system environment for dynamic rate adjustment for interaction monitoring, including dynamic adjustment of a rate at a storage node, according to some embodiments.

FIG. 5 illustrates further aspects of an example system environment for dynamic rate adjustment for interaction monitoring, including dynamic adjustment of a rate at a storage node, according to some embodiments. As discussed above, the interaction monitoring server 200 may monitor conditions and/or attributes in a distributed system and determine adjusted storage rates. In one embodiment, the interaction monitoring server 200 may determine and assign individual rates for individual components of the trace information storage functionality 120. For example, as shown in FIG. 5, the interaction monitoring server 200 may determine one or more storage rates 171 for the storage node 170. The storage rate at a particular storage node may indicate a rate at which trace information should be stored, preserved, or maintained at that storage node. For example, when a particular storage node receives trace information, the storage node may determine whether to store or discard the trace information based on the storage rate assigned to the storage node. In one embodiment, the storage node(s) may apply different storage rates or related policies to trace information associated with different services or hosts. In one embodiment, the same storage rates may be assigned to multiple storage nodes so that policies for trace information preservation may be carried out in a consistent manner across the distributed system.

Although FIGS. 3-5 illustrate the potential targets of rate changes as services 150A-150N, daemon(s) 160, and storage node(s) 170, it is contemplated that similar techniques may be used to adjust sampling rates and/or information retention rates for other types of entities. For example, the interaction monitoring system 100 may be used to monitor and change sampling rates and/or information retention rates for objects within elements of executable software, hardware components within a system, software elements communicating with inter-process communication within a single host, etc. In one embodiment, the interaction monitoring system 100 may be used to monitor and change sampling rates and/or information retention rates for nodes in a social graph.

Figure 6:
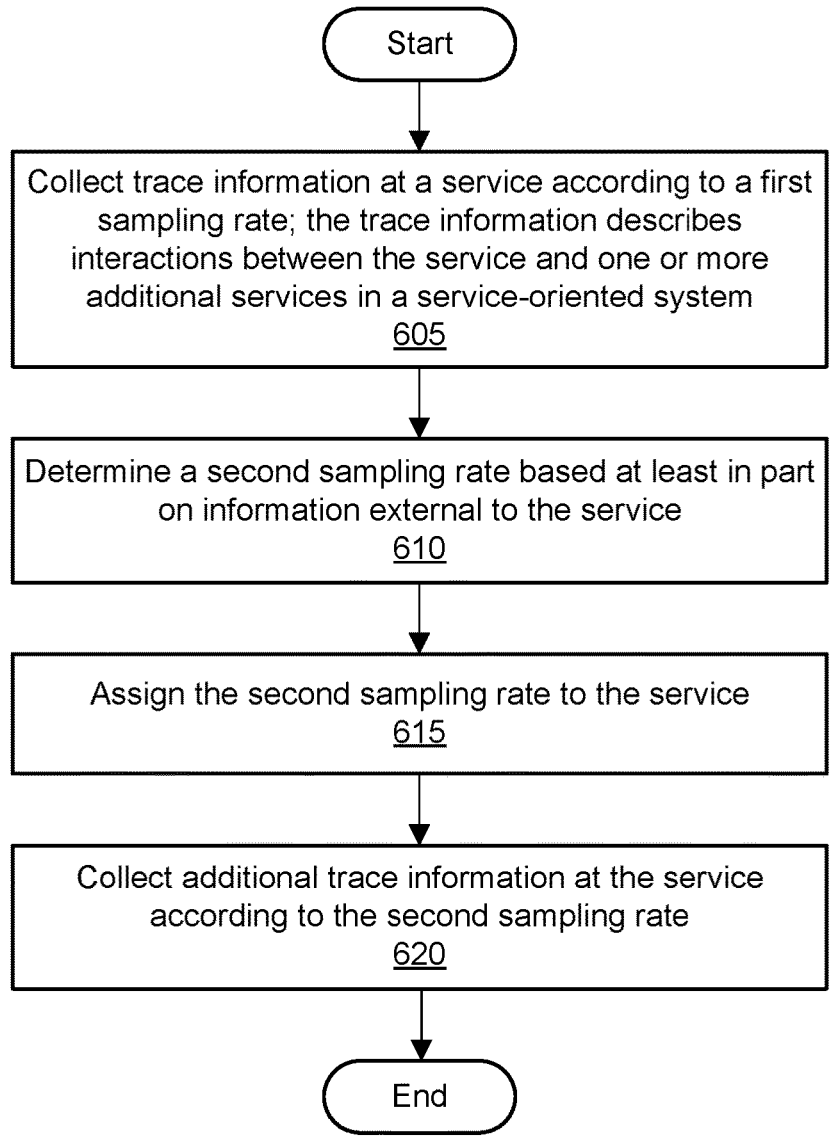
FIG. 6 is a flowchart illustrating a method for dynamically adjusting a sampling rate for a service, according to some embodiments.

FIG. 6 is a flowchart illustrating a method for dynamically adjusting a sampling rate for a service, according to some embodiments. As shown in 605, trace information may be collected at a service according to a first sampling rate. The trace information may describe interactions between the service and one or more additional services in a service-oriented system. The term "service" as used in FIG. 6 may refer to any service or component within a service. In one embodiment, initiation of a trace may be performed based on the first sampling rate, such that only a percentage (as indicated by the sampling rate) or other subset of interactions are traced.

As shown in 610, a second sampling rate may be determined based (at least in part) on information external to the service. The second rate may be higher or lower than the first rate. For example, the second sampling rate may be determined by an interaction monitoring server based on the monitoring of suitable conditions and/or attributes throughout the service-oriented system. In one embodiment, the collective performance of the service and the additional services, as well as other components, may be monitored to generate the information external to the service. In one embodiment, the individual performance of various additional services and/or other components may be monitored to generate the information external to the service. Accordingly, at least a portion of the information external to the service may represent global conditions in the service-oriented system. In some embodiments, externalities used to inform the dynamic adjustment of the sampling rate for a service may include, for example: the volume of traffic in all or part of the service-oriented system, the size of a fleet of hosts implementing the service, a determination of redundancy in the trace information, an anticipation of higher or lower traffic volume at a future point in time, a determination that a performance threshold has been crossed, and/or a determination that a performance threshold will be crossed at a future point in time.

As shown in 615, the second sampling rate may be assigned to the service. In one embodiment, the interaction monitoring server may assign the sampling rate to the service using any suitable technique for policy implementation. As shown in 620, additional trace data may be collected at the service according to the second sampling rate. In one embodiment, initiation of a trace may be performed based on the second sampling rate, such that only a percentage (as indicated by the sampling rate) or other subset of interactions are traced. In this manner, a feedback loop may be implemented to dynamically adjust the amount of traces being initiated at a particular service. To implement a feedback loop for rate changes, any of the operations shown in FIG. 6 may be performed repeatedly and/or continuously. For example, the operations shown in 610, 615, and 620 may be repeated any suitable number of times to adjust the sampling rate based on recent conditions, current conditions, and/or anticipated conditions in the system.

Figure 7:
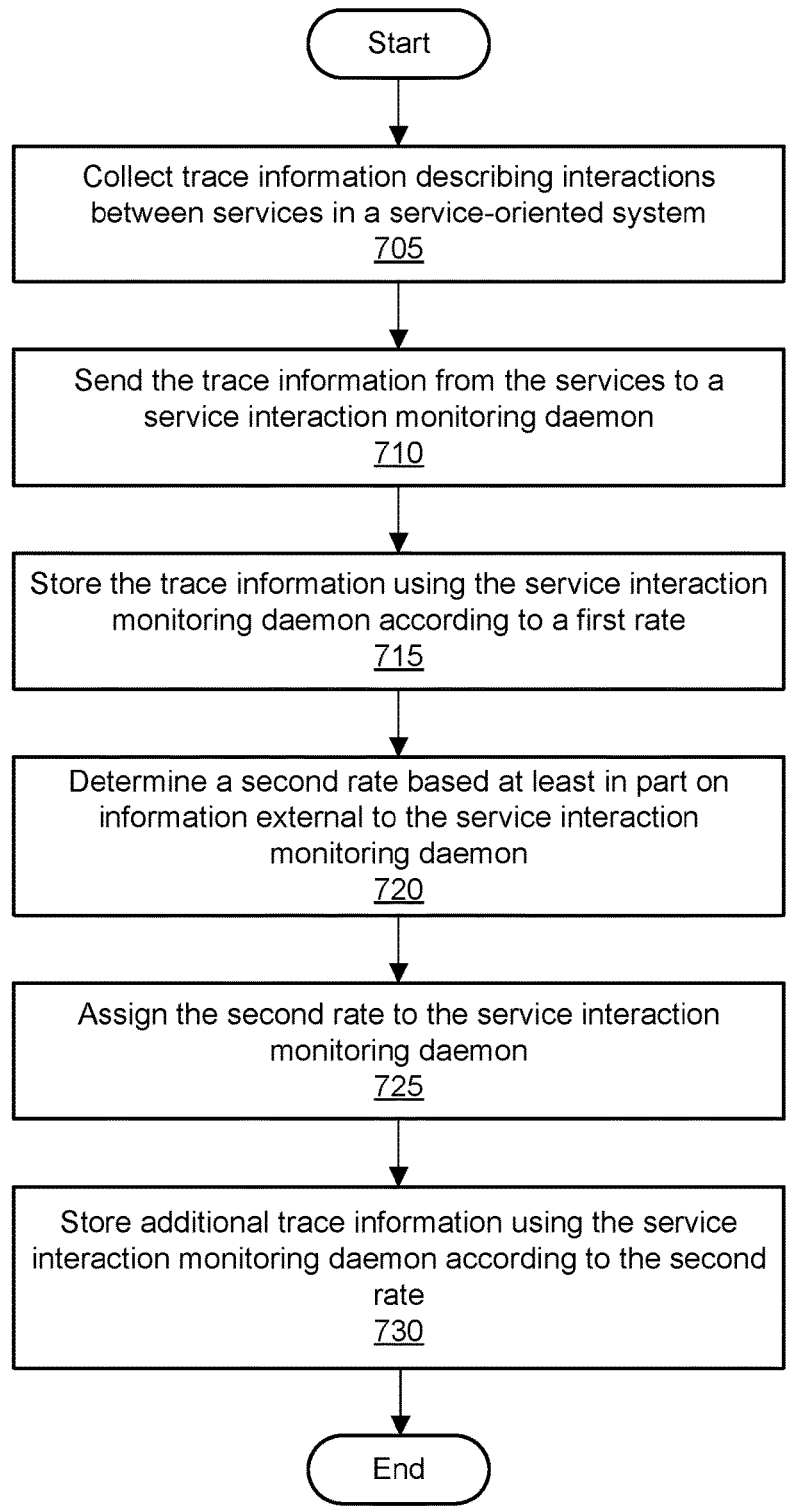
FIG. 7 is a flowchart illustrating a method for dynamically adjusting a preservation rate for an interaction monitoring daemon, according to some embodiments.

FIG. 7 is a flowchart illustrating a method for dynamically adjusting a preservation rate for an interaction monitoring daemon, according to some embodiments. As shown in 705, trace information may be collected, where the trace information describes interactions between services in a service-oriented system. In one embodiment, all or nearly all interactions may be traced. As shown in 710, the trace information may be sent from the services to an interaction monitoring daemon.

As shown in 715, the trace information may be stored using the daemon according to a first rate. Storing the trace information may include passing the trace information to a storage node, storing the trace information in local persistent storage, or otherwise preserving the trace information rather than discarding the trace information. By applying the first rate, only a percentage (as indicated by the first rate) or other subset of trace data may be stored.

As shown in 720, a second rate may be determined based (at least in part) on information external to the daemon. The second rate may be higher or lower than the first rate. For example, the second rate may be determined by an interaction monitoring server based on the monitoring of suitable conditions and/or attributes throughout the service-oriented system. In one embodiment, the collective performance of the multiple services or instances of a service, as well as other components, may be monitored to generate the information external to the daemon. In one embodiment, the individual performance of various services and/or other components may be monitored to generate the information external to the daemon. Accordingly, at least a portion of the information external to the daemon may represent global conditions in the service-oriented system. In some embodiments, externalities used to inform the dynamic adjustment of the storage rate for a daemon may include, for example: the volume of traffic in all or part of the service-oriented system, the size of a fleet of hosts, a determination of redundancy in the trace information, an anticipation of higher or lower traffic volume at a future point in time, a determination that a performance threshold has been crossed, and/or a determination that a performance threshold will be crossed at a future point in time.

As shown in 725, the second rate may be assigned to the daemon. In one embodiment, the interaction monitoring server may assign the rate to the daemon using any suitable technique for policy implementation. As shown in 730, additional trace information may be stored using the daemon according to the second rate. In this manner, a feedback loop may be implemented to dynamically adjust the amount of trace information being stored or otherwise preserved using a particular daemon. To implement the feedback loop for rate changes, any of the operations shown in FIG. 7 may be performed repeatedly and/or continuously. For example, the operations shown in 720, 725, and 730 may be repeated any suitable number of times to adjust the preservation rate based on recent conditions, current conditions, and/or anticipated conditions in the system.

Figure 8:
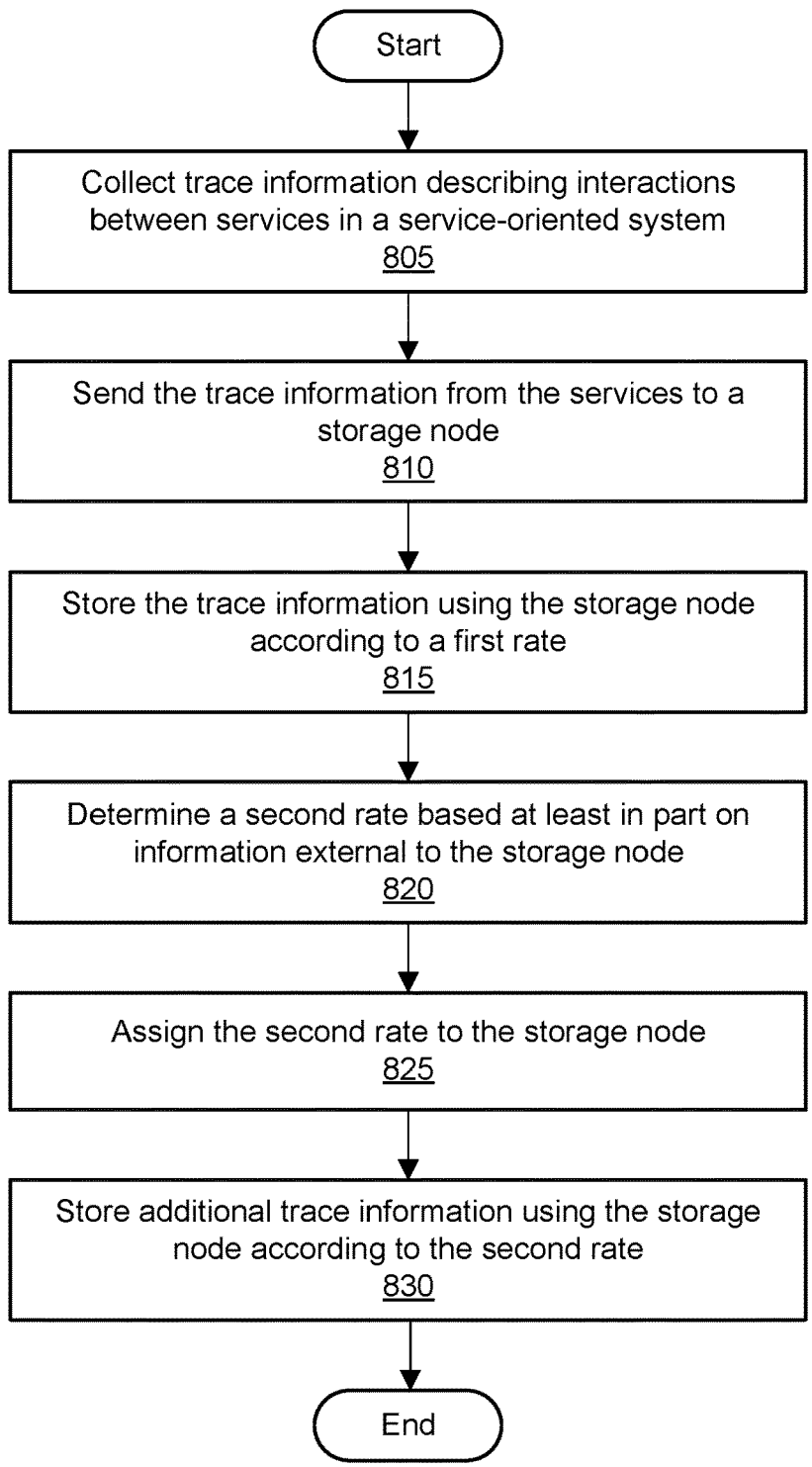
FIG. 8 is a flowchart illustrating a method for dynamically adjusting a preservation rate for a storage node, according to some embodiments.

FIG. 8 is a flowchart illustrating a method for dynamically adjusting a preservation rate for a storage node, according to some embodiments. As shown in 805, trace information may be collected, where the trace information describes interactions between services in a service-oriented system. In one embodiment, all or nearly all interactions may be traced. As shown in 810, the trace information may be sent from the services to a storage node, potentially using one or more interaction monitoring daemons or other components as intermediaries.

As shown in 815, the trace information may be stored using the storage node according to a first rate. Storing the trace information may include placing the trace information in local storage or otherwise preserving the trace information rather than discarding the trace information. By applying the first rate, only a percentage (as indicated by the first rate) or other subset of trace data may be stored.

As shown in 820, a second rate may be determined based (at least in part) on information external to the storage node. The second rate may be higher or lower than the first rate. For example, the second rate may be determined by an interaction monitoring server based on the monitoring of suitable conditions and/or attributes throughout the service-oriented system. In one embodiment, the collective performance of the multiple services or instances of a service, as well as other components, may be monitored to generate the information external to the storage node. In one embodiment, the individual performance of various services and/or other components may be monitored to generate the information external to the storage node. Accordingly, at least a portion of the information external to the storage node may represent global conditions in the service-oriented system. In some embodiments, externalities used to inform the dynamic adjustment of the storage rate for a storage node may include, for example: the volume of traffic in all or part of the service-oriented system, the size of a fleet of hosts, a determination of redundancy in the trace information, an anticipation of higher or lower traffic volume at a future point in time, a determination that a performance threshold has been crossed, and/or a determination that a performance threshold will be crossed at a future point in time.

As shown in 825, the second rate may be assigned to the storage node. In one embodiment, the interaction monitoring server may assign the rate to the storage node using any suitable technique for policy implementation. As shown in 830, additional trace information may be stored using the storage node according to the second rate. In this manner, a feedback loop may be implemented to dynamically adjust the amount of trace information being stored or otherwise preserved using a particular storage node. To implement the feedback loop for rate changes, any of the operations shown in FIG. 8 may be performed repeatedly and/or continuously. For example, the operations shown in 820, 825, and 830 may be repeated any suitable number of times to adjust the preservation rate based on recent conditions, current conditions, and/or anticipated conditions in the system.

Figure 9:
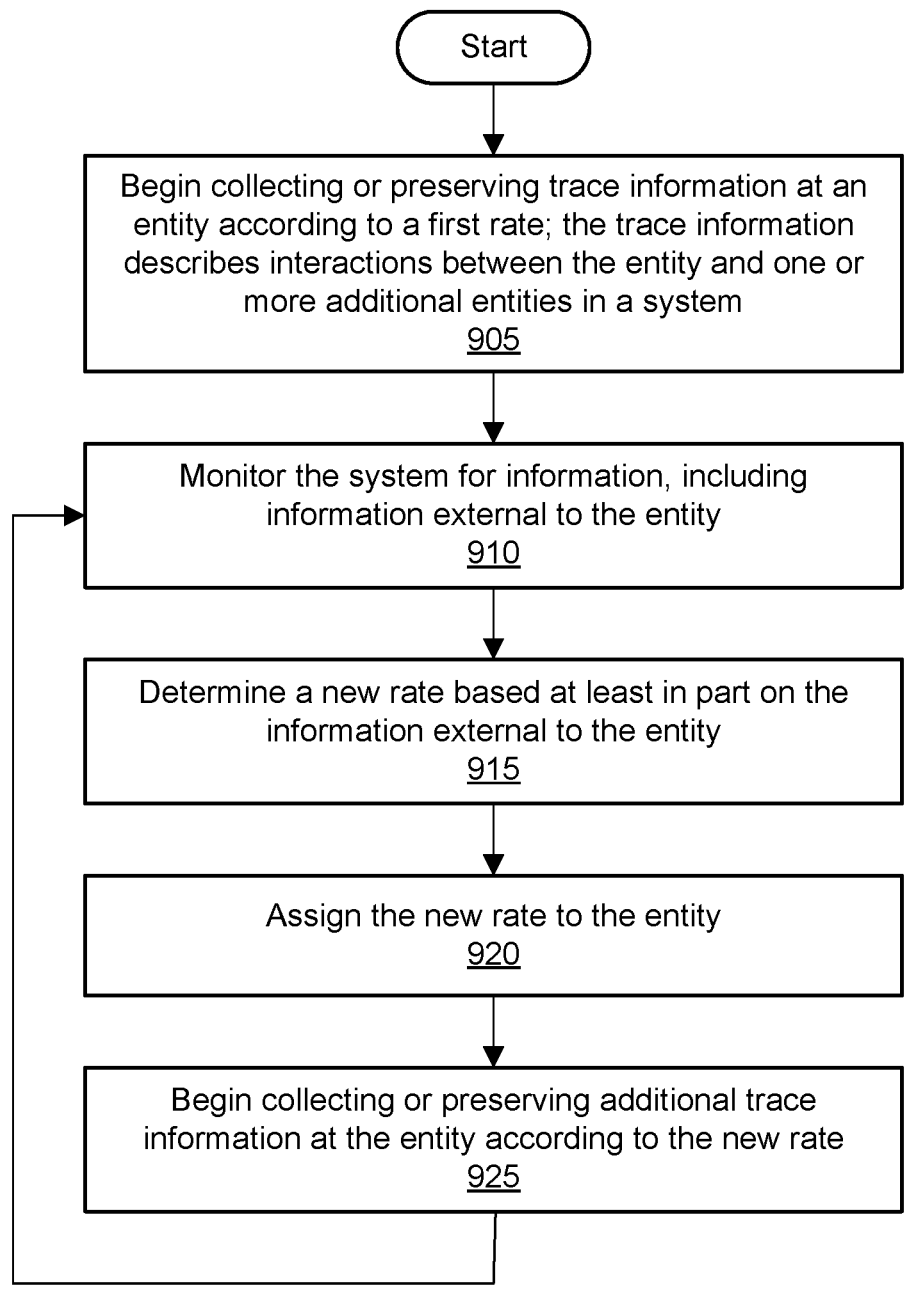
FIG. 9 is a flowchart illustrating a method for dynamically adjusting a rate for an entity using a feedback loop, according to some embodiments.

FIG. 9 is a flowchart illustrating a method for dynamically adjusting a rate for an entity using a feedback loop, according to some embodiments. As discussed above, the feedback loop for dynamic rate adjustment may be applied to any suitable entity that participates in a tracing environment, including services or components in a distributed, service-oriented system as well as other entities such as software objects, nodes in a social graph, etc. As shown in 905, trace information may be collected or preserved at an entity according to a first rate. The trace information may describe interactions between the entity and one or more additional entities in a system.

As shown in 910, the system may be monitored for information, including information external to the entity. As discussed above, any suitable information may be gathered, including performance metrics for individual entities within the system, aggregate performance metrics for multiple entities within the system, and/or information from outside the system. As shown in 915, a new rate may be determined based (at least in part) on information external to the entity. The new rate may be higher or lower than the first rate. For example, the new rate may be determined by an interaction monitoring server based on the monitoring of suitable conditions and/or attributes throughout the system.

As shown in 920, the new rate may be assigned to the entity. In one embodiment, the interaction monitoring server may assign the new rate to the entity using any suitable technique for policy implementation. As shown in 925, trace information may be collected or preserved at the entity according to the new rate. The method may then proceed with the monitoring operation shown in 910. Accordingly, the operations shown in 910-925 may be performed any suitable number of times to continuously and dynamically adjust the rates for initiating traces and/or preserving trace information at an entity.

Tracking Service Requests

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 10:
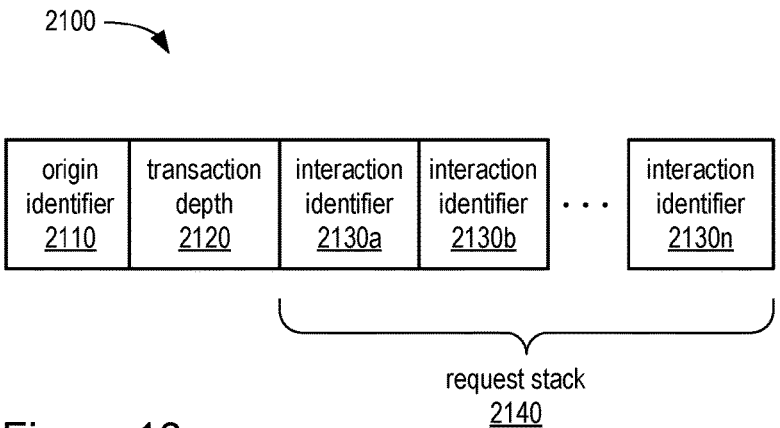
FIG. 10 illustrates an example format of a request identifier, according to some embodiments.

FIG. 10 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 10. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lowercase alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130a, the call of service "C" by service "B" may be identified by interaction identifier 2130b and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B 1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of services requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the shear number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130a-2130n may represent a series of interaction identifiers in ascending chronological order (where interaction identifier 2130a corresponds to the oldest service call and interaction identifier 2130n corresponds to the most recent service call).

In addition to the illustrated elements, request identifier 2100 may in various embodiments include one or more portions of data for error detection and/or error correction. Examples of such data include but are not limited to various types of checksums.

Figure 11:
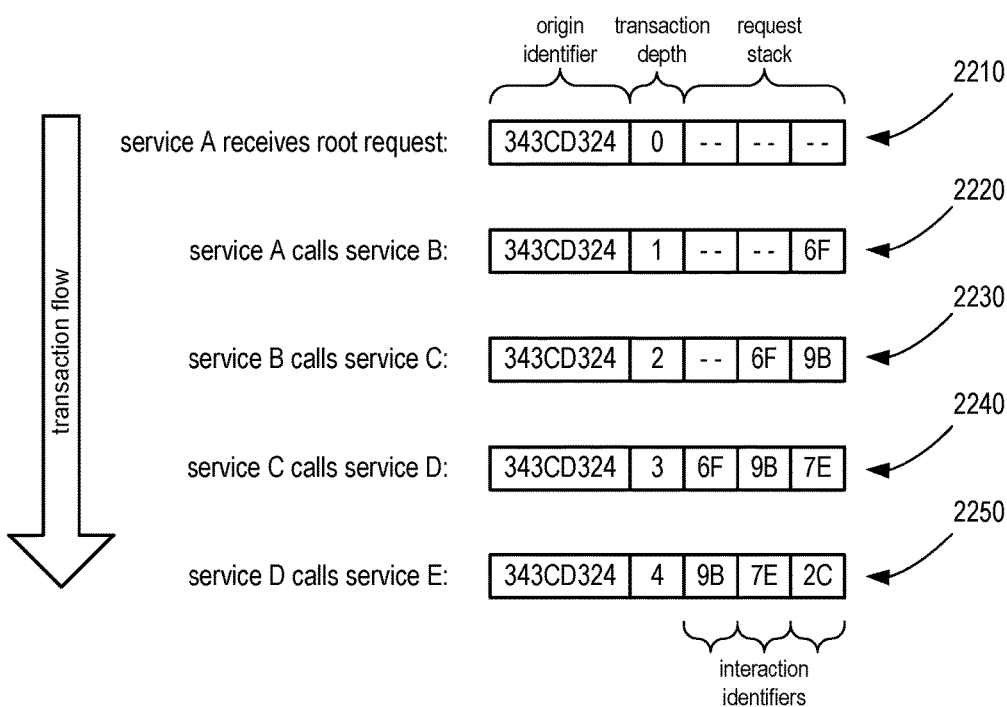
FIG. 11 illustrates an example transaction flow for fulfilling a root request, according to some embodiments.

FIG. 11 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 12). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 12:
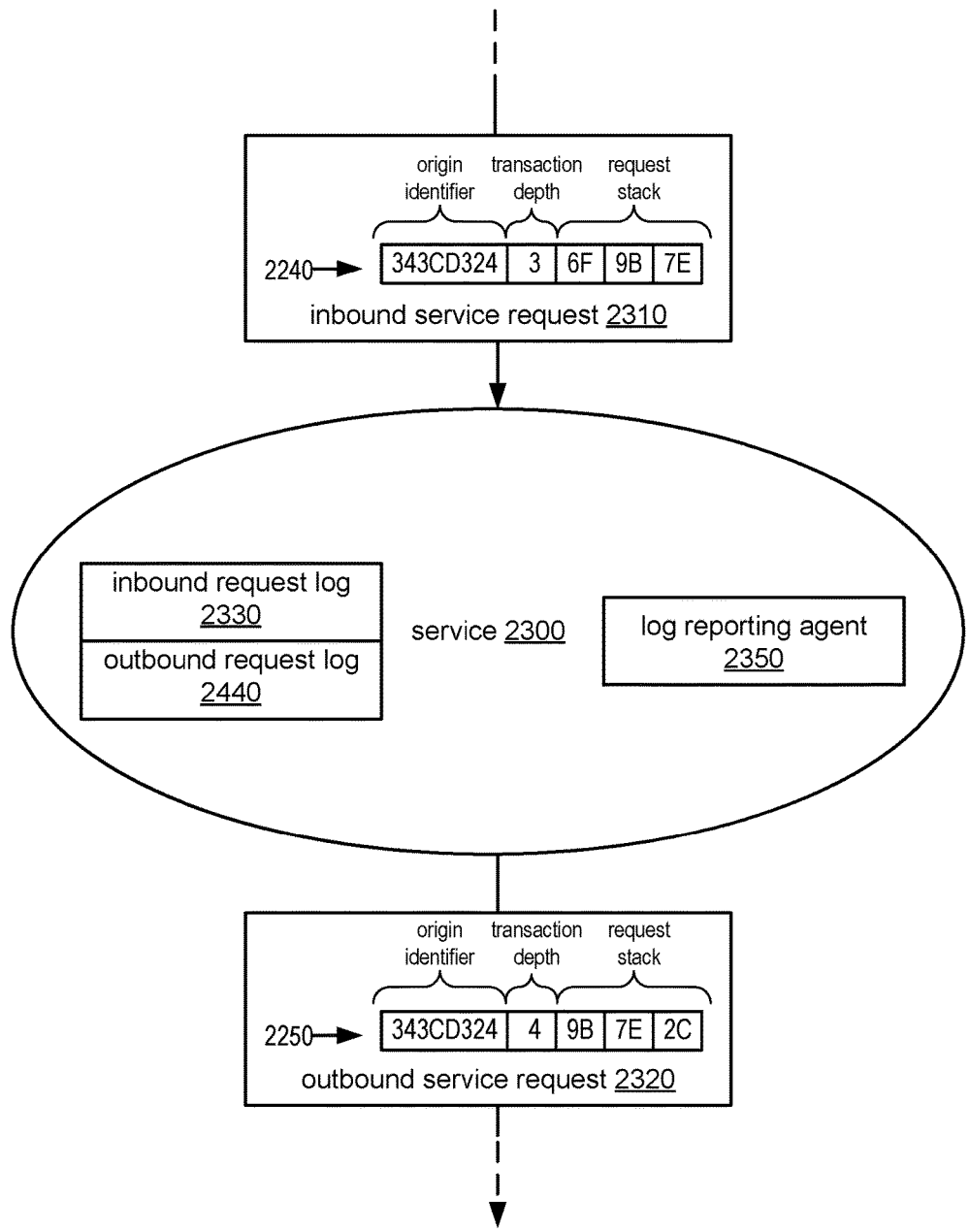
FIG. 12 illustrates one example of a service of a service-oriented system, according to some embodiments.

Referring collectively to FIG. 11 and FIG. 12, a representation of the receipt of an inbound service request (or service call) 2310 as well as the issuance of an outbound request 2320 by service 2300 is illustrated. Request identifiers 2240 and 2250 of FIG. 12 may correspond to the like-numbered elements of FIG. 11. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 11. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 13:
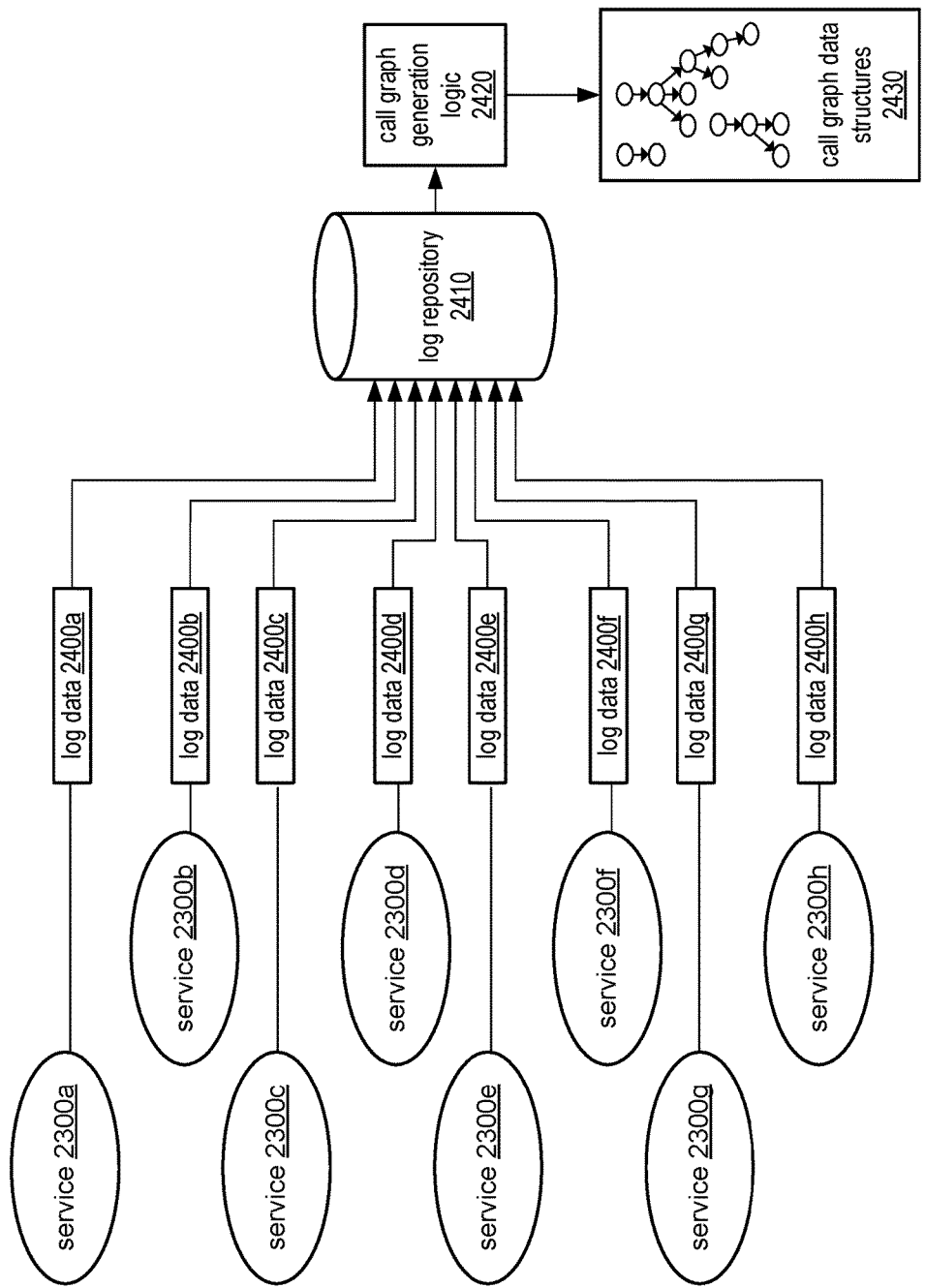
FIG. 13 illustrates an example data flow diagram for the collection of log data and generation of a call graph, according to some embodiments.

Referring collectively to FIG. 12 and FIG. 13, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 13. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 13, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 14:
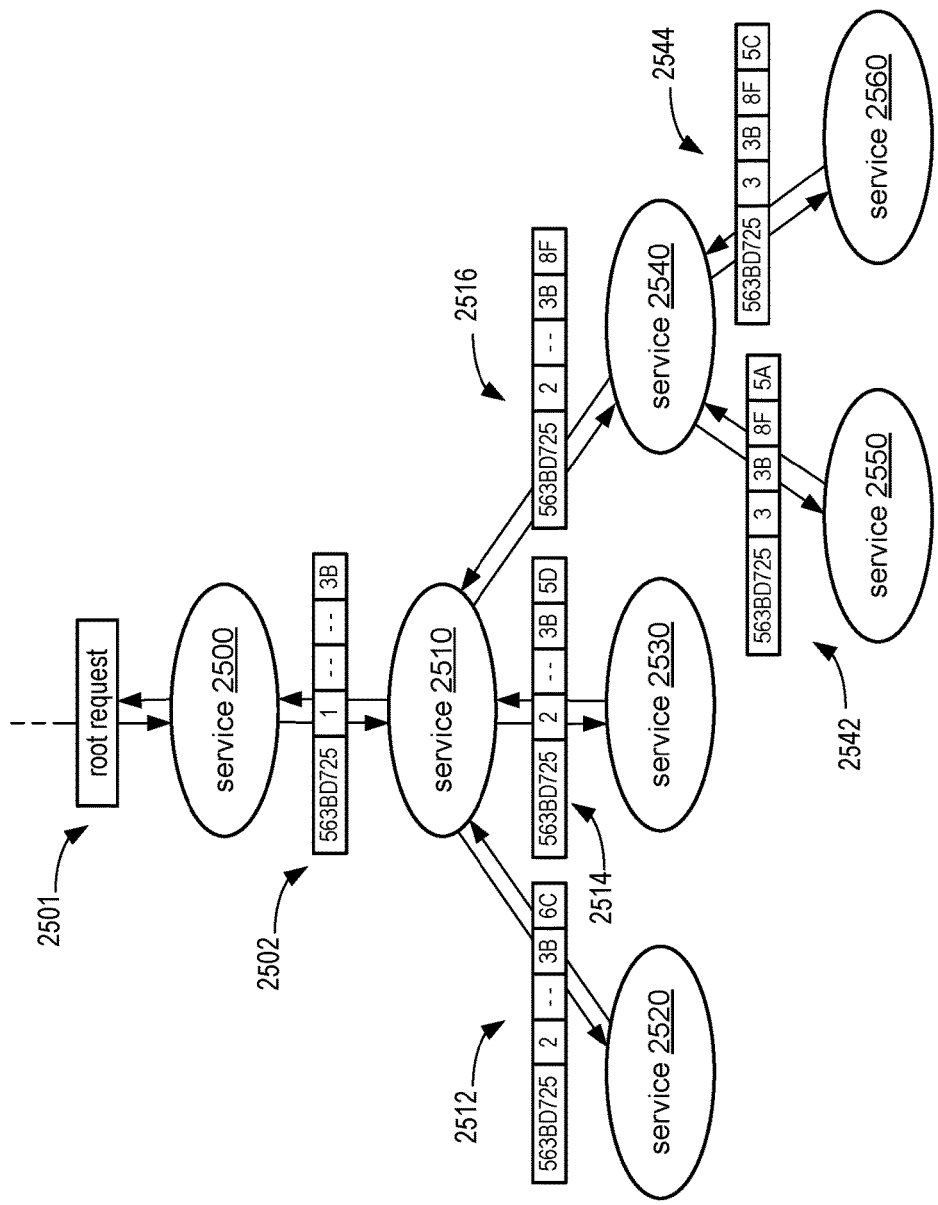
FIG. 14 illustrates an example visual representation of a call graph and request identifiers from which such call graph is generated, according to some embodiments.

FIG. 14 illustrates a visual representation of such a call graph data structure that may be generated by call graph generation logic 2420. In various embodiments, a call graph data structure may include any data structure that specifies, for a given root request, all the services called to fulfill that root request. Note that while FIG. 14 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 14 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 10. Generating the data structure may also include determining that the request stack of a given node at a given level within the hierarchy includes an interaction identifier that is the same as an interaction identifier of the request stack of another node located within an adjacent level of the hierarchy. For instance, the call graph generation logic may include any of the various interaction identifier comparison techniques described above. In response to determining such match, the call graph generation logic may indicate a service call as an edge between said given node and said other node. Examples of such an edge are illustrated as the edges coupling the nodes of FIG. 14 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 12 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 12, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 12, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 12.

In various embodiments, the call graph generation logic may also generate the new depth value such that the new depth value is a result of incrementing the first depth value. For example, in the illustrated embodiment of FIG. 12, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 12, the inbound and outbound request identifiers may be stored in inbound request log 2330 and outbound request log 2340, respectively.

For each of the interactions between the services 2500, 2510, 2520, 2530, 2540, 2550, and 250, a request path or downstream path is shown. For each of the interactions between the services 2500, 2510, 2520, 2530, 2540, 2550, and 250, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A downstream service that is a leaf in the relevant call graph (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 10.

Figure 15:
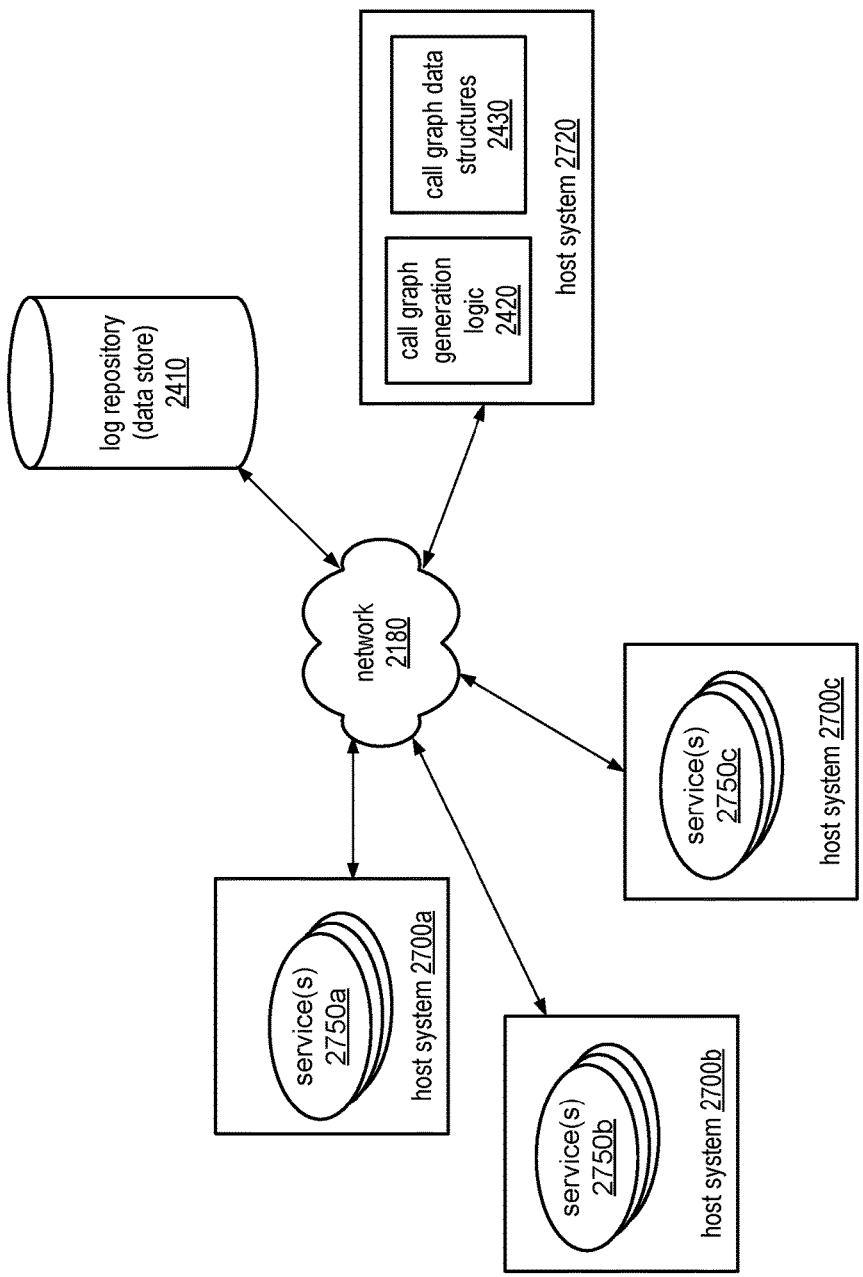
FIG. 15 illustrates an example system configuration for tracking service requests, according to some embodiments.

One example system configuration for tracking service requests is illustrated in FIG. 15. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700*a*-*c* and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700*a* may be configured to execute program instruction to implement one or more services 2750*a*. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700*b*-*c* and services 2750*b*-*c* may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a general-purpose computer system that includes or is configured to access one or more computer-readable media. FIG. 16 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement an interaction monitoring system, wherein the interaction monitoring system is configured to:
determine a change in a sampling rate for an entity, wherein the sampling rate is for sampling interactions between the entity and one or more additional entities to collect trace information, wherein determination of the change in the sampling rate is performed after a collection of the trace information has been initiated at the entity and comprises:
monitor information external to the entity, wherein the information external to the entity comprises:
network traffic metrics determined based at least in part on a respective volume of traffic at various ones of the one or more additional entities in a system comprising the entity and the one or more additional entities,
a size of a fleet of hosts for the entity and the one or more additional entities,
an indication of an anticipated higher or lower network traffic volume in the system comprising the entity and the one or more additional entities, or
a determination, made external to the entity, of redundancy in the trace information; and
determine the change in the sampling rate for the entity based at least in part on the monitored information external to the entity; and
initiate, at the entity, a collection of additional trace information, wherein the collection of the additional trace information is initiated according to the change in the sampling rate for the entity.

2. The system as recited in claim 1, wherein the interaction monitoring system is further configured to:
monitor a collective performance of the entity and the one or more additional entities after at least a portion of the trace information is collected at the entity according to the sampling rate; and
determine the information external to the service based on the collective performance of the entity and the one or more additional entities.

3. The system as recited in claim 1, wherein the interaction monitoring system is further configured to:
monitor a performance of individual ones of the additional entities after at least a portion of the trace information is collected at the entity according to an initial sampling rate; and
determine the information external to the entity from which to determine the change in the sampling rate based on the performance of the individual ones of the additional entities.

4. The system as recited in claim 1, wherein the change in the sampling rate is determined to be an increase in the sampling rate based at least in part on one or more of the network traffic metrics in the system and an indication that the trace information collected is insufficient for an analysis being conducted or to be conducted.

5. The system as recited in claim 1, wherein the change in the sampling rate is determined to be a reduction in the sampling rate based at least in part on one or more of the network traffic metrics in the system and an indication that the trace information collected is excessive for an analysis being conducted or to be conducted.

6. The system as recited in claim 1, wherein the information external to the entity indicates an anticipated higher network traffic volume in the system and the change in the sampling rate is a reduction in the sampling rate.

7. The system as recited in claim 1, wherein the information external to the entity indicates an anticipated lower network traffic volume in the system and the change in the sampling rate is an increase in the sampling rate.

8. A computer-implemented method, comprising:
determining a change in a sampling rate for an entity, wherein the sampling rate is for sampling interactions between the entity and one or more additional entities to collect trace information, wherein determining the change in the sampling rate is performed after a collection of the trace information has been initiated at the entity and comprises:
monitoring information external to the entity, wherein the information external to the entity comprises:
network traffic metrics determined based at least in part on a respective volume of traffic at various ones of the one or more additional entities in a system comprising the entity and the one or more additional entities,
a size of a fleet of hosts for the entity and the one or more additional entities,
an indication of an anticipated higher or lower network traffic volume in the system comprising the entity and the one or more additional entities, or
a determination, made external to the entity, of redundancy in the trace information; and
determining the change in the sampling rate for the entity based at least in part on the monitored information external to the entity; and
initiating, at the entity, a collection of additional trace information, wherein the collection of the additional trace information is initiated according to the change in the sampling rate for the entity.

9. The method as recited in claim 8, further comprising:
monitoring a collective performance of the entity and the one or more additional entities after the collection of the trace information is initiated at the entity, and
determining the information external to the entity based on the collective performance of the entity and the one or more additional entities.

10. The method as recited in claim 8, further comprising:
monitoring a performance of individual ones of the additional entities after the collection of the trace information is initiated at the entity; and
determining the information external to the entity based on the performance of the individual ones of the additional entities.

11. The method as recited in claim 8, further comprising determining the change in the sampling rate to be an increase in the sampling rate based at least in part on one or more of the network traffic metrics in the system and an indication that the trace information collected is insufficient for an analysis being conducted or to be conducted.

12. The method as recited in claim 8, further comprising determining the change in the sampling rate to be a reduction in the sampling rate based at least in part on one or more of the network traffic metrics in the system and an indication that the trace information collected is excessive for an analysis being conducted or to be conducted.

13. The method as recited in claim 8, wherein the external information indicates an anticipated higher network traffic volume in the system and the change in the sampling rate is a reduction in the sampling rate.

14. The method as recited in claim 8, wherein the external information indicates an anticipated lower network traffic volume in the system and the change in the sampling rate is an increase in the sampling rate.

15. A computer-readable storage medium storing program instructions computer-executable to perform:
determining a change in a sampling rate for an entity, wherein the sampling rate is for sampling interactions between the entity and one or more additional entities to collect trace information, wherein determining the change in the sampling rate is performed after a collection of the trace information has been initiated at the entity and comprises:
monitoring information external to the entity, wherein the information external to the entity comprises:
network traffic metrics determined based at least in part on a respective volume of traffic at various ones of the one or more additional entities in a system comprising the entity and the one or more additional entities,
a size of a fleet of hosts for the entity and the one or more additional entities,
an indication of an anticipated higher or lower network traffic volume in the system comprising the entity and the one or more additional entities, or
a determination, made external to the entity, of redundancy in the trace information; and
determining the change in the sampling rate for the entity based at least in part on the monitored information external to the entity; and
initiating, at the entity, a collection of additional trace information, wherein the collection of the additional trace information is initiated according to the change in the sampling rate for the entity.

16. The computer-readable storage medium as recited in claim 15, wherein the program instructions are computer-executable to perform:
monitoring a performance of the plurality of additional entities; and
determining the information external to the entity based at least in part on the performance of the plurality of additional entities.

17. The computer-readable storage medium as recited in claim 15, wherein the program instructions are computer-executable to perform: determining the change in the sampling rate to be an increase in the sampling rate based at least in part on one or more of the network traffic metrics in the system and an indication that the trace information collected is insufficient for an analysis being conducted or to be conducted.

18. The computer-readable storage medium as recited in claim 15, wherein the program instructions are computer-executable to perform: determining the change in the sampling rate to be a reduction in the sampling rate based at least in part on one or more of the network traffic metrics in the system and an indication that the trace information collected is excessive for an analysis being conducted or to be conducted.

19. The computer-readable storage medium as recited in claim 15, wherein the external information indicates an anticipated higher network traffic volume in the system and the change in the sampling rate is a reduction in the sampling rate.

20. The computer-readable storage medium as recited in claim 15, wherein the external information indicates an anticipated lower network traffic volume in the system and the change in the sampling rate is an increase in the sampling rate.

* * * * *